United States Patent
Gooch

(10) Patent No.: US 9,445,240 B2
(45) Date of Patent: Sep. 13, 2016

(54) SYSTEMS AND METHODS FOR PEDESTRIAN INDOOR POSITIONING

(71) Applicant: Cecil Gooch, North Hollywood, CA (US)

(72) Inventor: Cecil Gooch, North Hollywood, CA (US)

( * ) Notice: Subject to any disclaimer, the term of this patent is extended or adjusted under 35 U.S.C. 154(b) by 0 days.

(21) Appl. No.: 14/705,324

(22) Filed: May 6, 2015

(65) Prior Publication Data

US 2015/0341754 A1 Nov. 26, 2015

Related U.S. Application Data

(60) Provisional application No. 61/988,998, filed on May 6, 2014.

(51) Int. Cl.
*H04W 24/00* (2009.01)
*H04W 4/04* (2009.01)

(52) U.S. Cl.
CPC ..................................... *H04W 4/04* (2013.01)

(58) Field of Classification Search
CPC .... H04W 4/043; H04W 4/021; H04W 4/206
USPC ......... 455/404.1, 456.1, 456.3, 456.5, 456.6, 455/457, 41.1, 41.2, 404.2
See application file for complete search history.

(56) References Cited

U.S. PATENT DOCUMENTS

| | | | | |
|---|---|---|---|---|
| 8,014,833 B2* | 9/2011 | Rao | ...................... | H04W 84/005 455/343.1 |
| 8,903,426 B2* | 12/2014 | Tholkes | ................ | H04W 4/021 345/419 |
| 8,972,168 B2* | 3/2015 | Acker, Jr. | .............. | G01C 21/00 455/456.1 |
| 2013/0262223 A1* | 10/2013 | Catane | ............... | G06Q 30/0261 705/14.53 |
| 2014/0099974 A1* | 4/2014 | Chun | .................... | H04W 4/043 455/456.3 |
| 2015/0018011 A1* | 1/2015 | Mendelson | .......... | G01C 21/206 455/456.3 |
| 2015/0268326 A1* | 9/2015 | Sung | ...................... | H04W 4/04 455/456.3 |

\* cited by examiner

*Primary Examiner* — Cong Tran
(74) *Attorney, Agent, or Firm* — Davis Brown Law Firm; Matthew Coryell

(57) ABSTRACT

A systems and methods for determining the indoor localization of a mobile device comprising; a plurality of networked sensors positioned in a building capable of detecting a mobile device signal, wherein the position of the plurality of networked sensors defines a coordinate grid; a server receiving mobile device signal input from the plurality of networked sensors; a map module accessible by the server, the map module having a map of the building and an overlay of the coordinate grid, wherein the map module determines localization of the mobile device with reference to the map and the sensors of the coordinate grid detecting the mobile device signal; and one or more location based service module accessible to a user of the mobile device.

10 Claims, 28 Drawing Sheets

SYSTEMS AND METHODS FOR PEDESTRIAN INDOOR POSITIONING

CROSS-REFERENCE TO RELATED APPLICATION(S)

This application claims priority to U.S. Patent Application No. 61/988,998, filed May 6, 2014, which is hereby incorporated by reference in its entirety.

FIELD OF THE INVENTION

The present invention relates to systems and methods for tracking indoor positioning of mobile device users and localization based services based on the same.

BACKGROUND OF THE INVENTION

The proliferation of mobile devices with GPS capabilities has lead to the development of a multitude of applications that rely on a device's ability to determine its location. However the usefulness of these location based services is diminished when the user is within a building where GPS and data signals are attenuated or undetectable. This is especially problematic in large complex buildings such as shopping malls or hospitals where navigation can be very challenging and large dead zones frequently exist. Accordingly, there is need in the art for location based system for mobile devices for indoor use where there is limited GPS and data connectivity.

BRIEF SUMMARY OF THE INVENTION

Disclosed herein is a system for determining the indoor localization of a mobile device comprising; a plurality of networked sensors, positioned in a building, capable of detecting a mobile device signal, wherein the position of the plurality of networked sensors defines a coordinate grid; a server receiving mobile device signal input from the plurality of networked sensors; a map module accessible by the server, the map module having a map of the building and an overlay of the coordinate grid, wherein the map module determines localization of the mobile device with reference coordinate grid; and one or more location based service module receiving input from the map module and accessible to a user of the mobile device.

While multiple embodiments are disclosed, still other embodiments will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
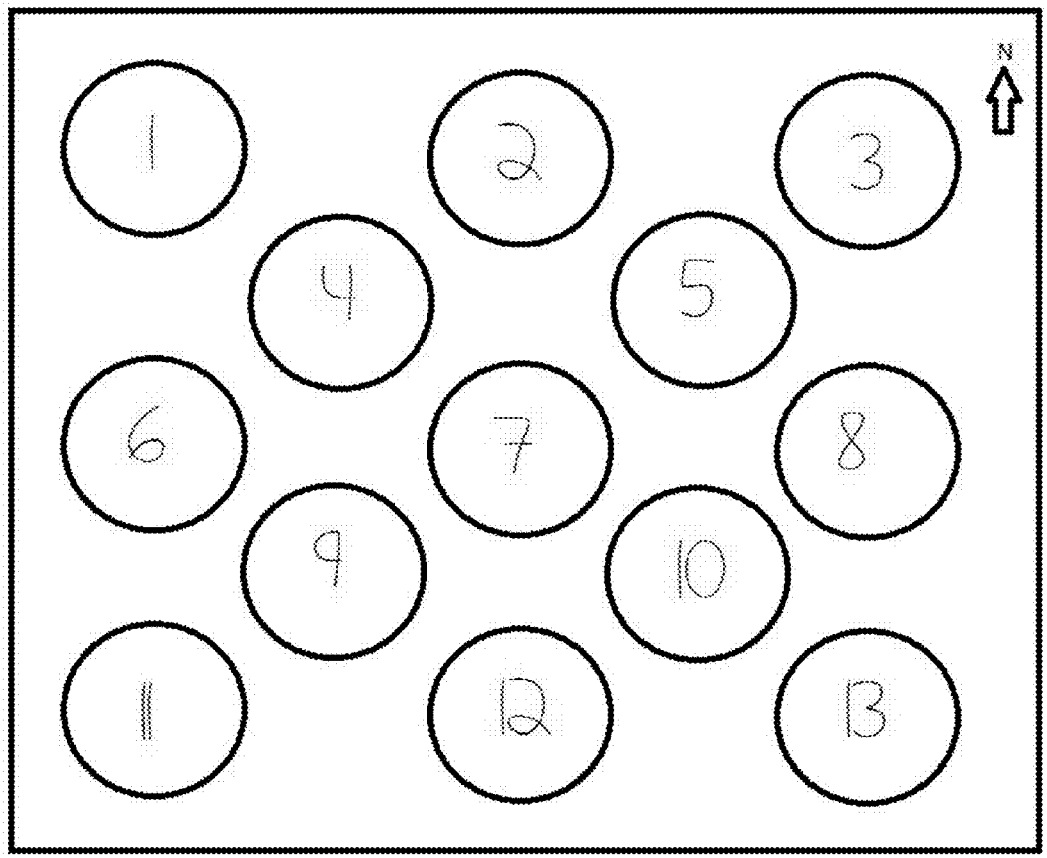
FIG. 1 depicts a schematic of a plurality of networked sensors according to certain embodiments.

Disclosed herein is a system for determining the indoor localization of a mobile device comprising; a plurality of networked sensors, positioned in a building, capable of detecting a mobile device signal, wherein the position of the plurality of networked sensors defines a coordinate grid; a server receiving mobile device signal input from the plurality of networked sensors; a map module accessible by the server, the map module having a map of the building and an overlay of the coordinate grid, wherein the map module determines localization of the mobile device with reference coordinate grid; and one or more location based service module receiving input from the map module and accessible to a user of the mobile device.

One general aspect includes a system for determining the indoor localization of a mobile device including. The system also includes a plurality of networked sensors, positioned in a building, capable of detecting a mobile device signal, where the position of the plurality of networked sensors defines a coordinate grid. The system also includes a server receiving mobile device signal input from the plurality of networked sensors. The system also includes a map module accessible by the server, the map module having a map of the building and an overlay of the coordinate grid, where the map module determines localization of the mobile device with reference coordinate grid. The system also includes one or more location based service (LBS) module receiving input from the map module and accessible to a user of the mobile device. Other embodiments of this aspect include corresponding computer systems, apparatus, and computer programs recorded on one or more computer storage devices, each configured to perform the actions of the methods.

Implementations may include one or more of the following features. The system where the plurality of networked sensors are wi-fi sensors. In certain aspects, the plurality of networked sensors are bluetooth sensors. In further aspects, the bluetooth sensors have a sensor field of about six feet. In certain further aspects, the plurality of networked sensors are a combination of wi-fi sensors and bluetooth sensors. In still further aspects, each of the plurality of networked sensors has a minimally overlapping detection field. According to certain embodiments, the mobile device signal comprises a unique identification number. In further embodiments, the mobile device signal is a unique identification number and a signal strength indicator. In certain aspects, the LBS service module includes a navigation module. The system where the LBS service module includes a navigation module. The system may also include the system where the LBS service module includes a retail module. The system may also include systems and methods for pedestrian indoor positioning. Implementations of the described techniques may include hardware, a method or process, or computer software on a computer-accessible medium.

Sensors

Prior art navigation systems do not provide accurate method of indoor navigation nor do they provide for 3-Dimensional navigation as is required when attempting to navigate between multiple vertically stacked floors. The system disclosed herein provides location, speed and vector direction of a mobile device on the x, y, and z axes. A "mobile device" can comprise any of a wide variety of devices, such as, without limitation, a mobile phone, smartphone, personal digital assistant, tablet computer, handheld computing device, and the like. The mobile devices managed by the disclosed system may, for example, include or consist of mobile devices that run the Android™, IOS, or Windows Mobile operating system (or some subset thereof). As will be recognized, however, the architecture disclosed herein may be used with other mobile device operating systems, including operating systems that may be developed in the future.

According to certain embodiments, the sensors include, but not are limited to a Wi-Fi, Bluetooth or combination of the two. The average Bluetooth device uses a max power output of 100 (mW). According to certain embodiments, instead of trying to boost the signal, system sensors have attenuated strength which then narrows the possible location of a wireless device. In certain implementations, the plurality of sensors differ from a traditional Bluetooth device in that range is attenuated relative to typical Bluetooth device. For example, according to certain embodiments, a Bluetooth sensor of the disclosed system may have a signal strength of about ⅕ of an average Bluetooth device, resulting in an effective field of about 6×6 ft. compared to the typical 30×30 ft. Furthermore, rather than having a few sensors/routers in a building, as many as 1,000s of sensors are used on a given level. And each sensor is a unique and a distinct landmark in the sensor array. The combination of relatively small sensor field and high sensor number result in increased spatial resolution of the system and increased confidence that a given sensors detection of a mobile device is indicative of a user's proximity to the sensor.

User Detection

As a user's mobile device is detected by a sensor, it is assigned a unique numeric ID number (UID) for tracking the user as they move from one sensor field to another. UIDs can be derived by way of the devices MAC address or any other unique identifier detectable by the sensor. According to certain embodiments, in addition to tracking the UID, sensors detect a signal strength value (SSV) which serves as a proxy for the users proximity to the individual sensor. According to certain embodiments, the SSV is a received signal strength indicator (RSSI). According to further embodiments, the SSV is a received channel power indicator (RCPI). If the SSV of a mobile device stays the same, it is assumed the device is stationary. Or if the SSV is getting weaker or stronger, it is assumed the mobile device is moving away from or approaching the sensor, respectively.

The current detection capacity of a Bluetooth device is 8 unique devices. In certain implementations, to boost the capacity of a given sensor to possibly detect up to dozens or hundreds in its region, the system incorporates an eliminating cycler algorithm. The algorithm allows the sensor to detect 8 unique devices based on UID number. Once catalogued, those 8 unique devices would be ignored and a new unique 8 devices would be allowed to be detected and so on—until no unique devices are detected. Then the remaining devices still in the sensor range are redetected and so on. This procedure allows for high population functionality for the system while also providing more fine grain data collection within a sensor range.

According to certain embodiments, individual sensors detect a mobile device within range and transmit the data about the mobile device back to the server. According to alternative embodiments, the mobile device detects sensors within a detectable range and transmits data about detected sensors back to the server via a WLAN network.

FIG. 1 depicts a schematic of a plurality of networked sensors according to certain embodiments. In certain implementations, the sensor field of each sensor is barely strong enough to avoid overlap. Minimizing sensor field overlap serves to increase the spatial resolution of the system because a smaller number sensors detecting the user servers to increase the level of confidence that detection of a user is indicative of user proximity. For example, if a mobile device is in the field of sensor 7, it will be barely out of the range of sensors 4, 5, 9, and 10. While completely out of the range of sensors 1, 2, 3, 6, 8, 11, 12 and 13. As a mobile device moves through the fields of different sensors, motion, speed and vector course is calculated.

Figure 2:
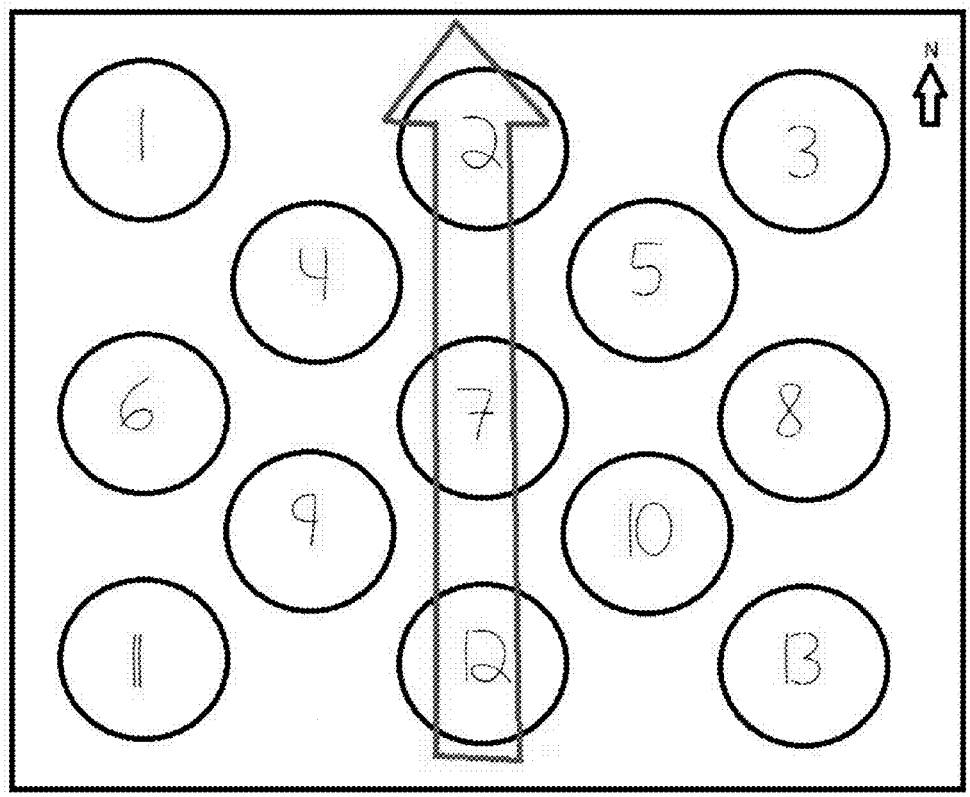
FIG. 2 shows a schematic of a users movement through sensor fields according to certain embodiments.

FIG. 2 shows a schematic of a user's movement through sensor fields according to certain embodiments. In certain implementations, the system determines the position and direction of movement of the user by assessing the pattern of movement of the user through the sensor fields. By way of example, if the system detected a mobile device with the sensors in the sequence: sensor 12, then 7, then 2, it would be determined that the user was moving north.

Figure 3:
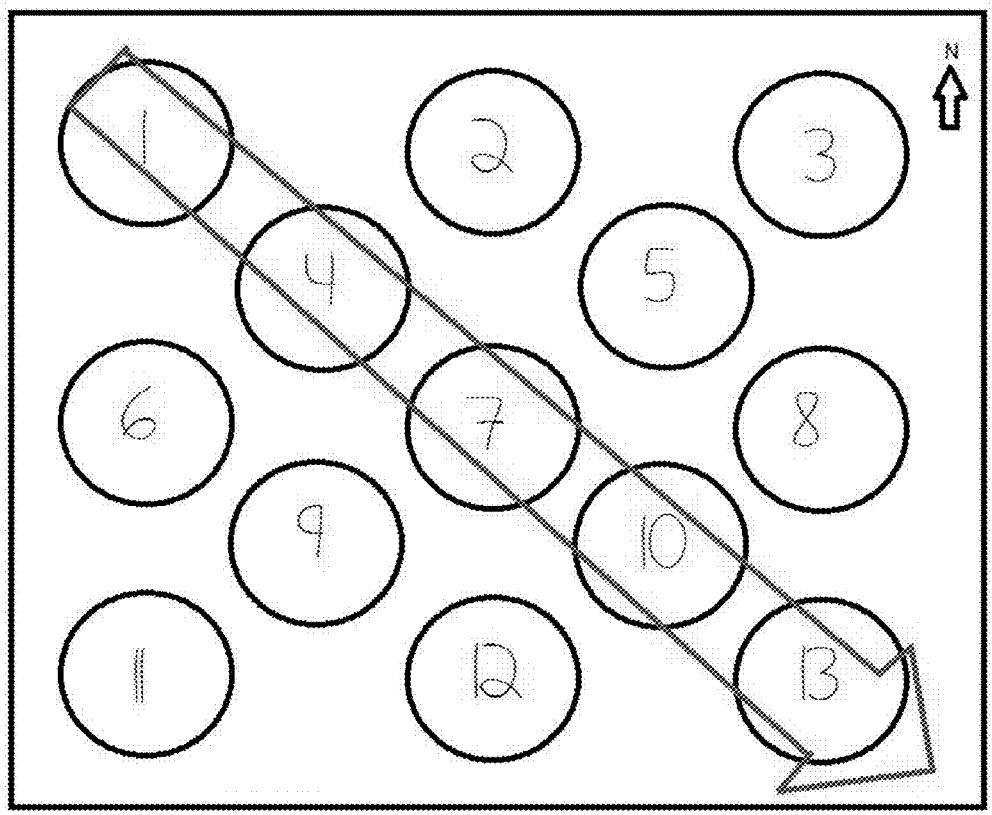
FIG. 3 shows a schematic of a users movement through sensor fields according to certain embodiments.

As shown in FIG. 3, if the user moves from sensor 1, then 4, then 7, then 10, then 13, the system would determine the user is moving southeast.

Figure 4:
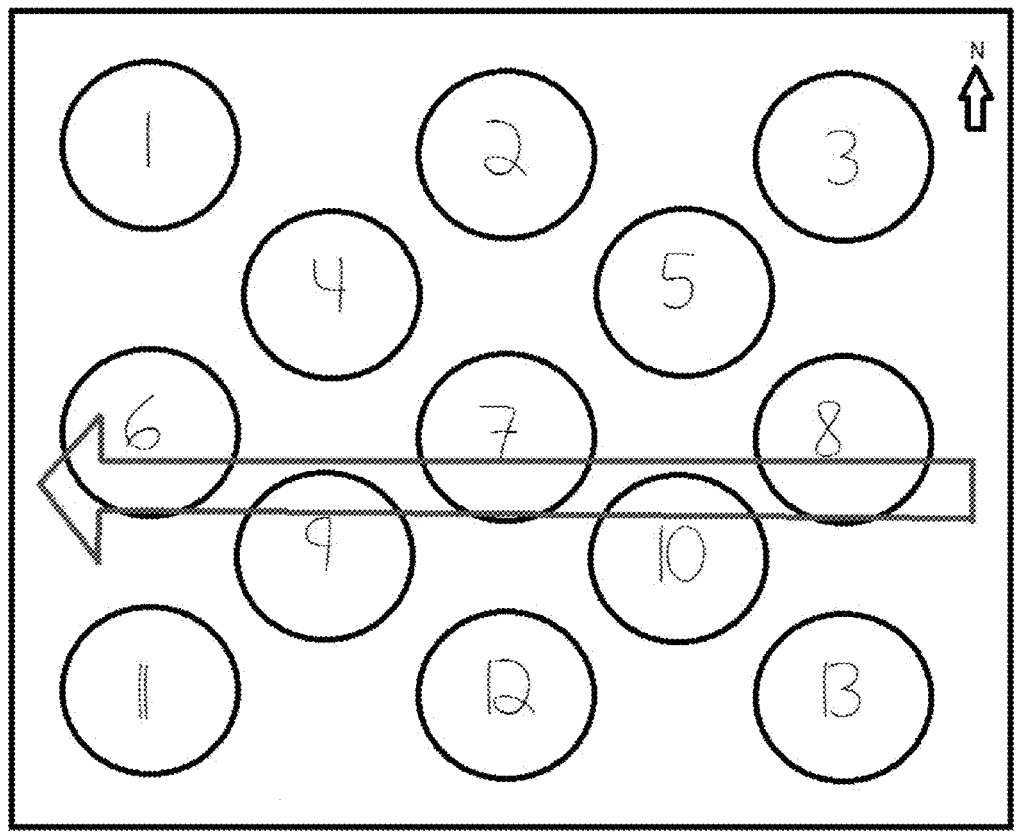
FIG. 4 a schematic of a users movement through sensor fields according to certain embodiments.
Figure 5:
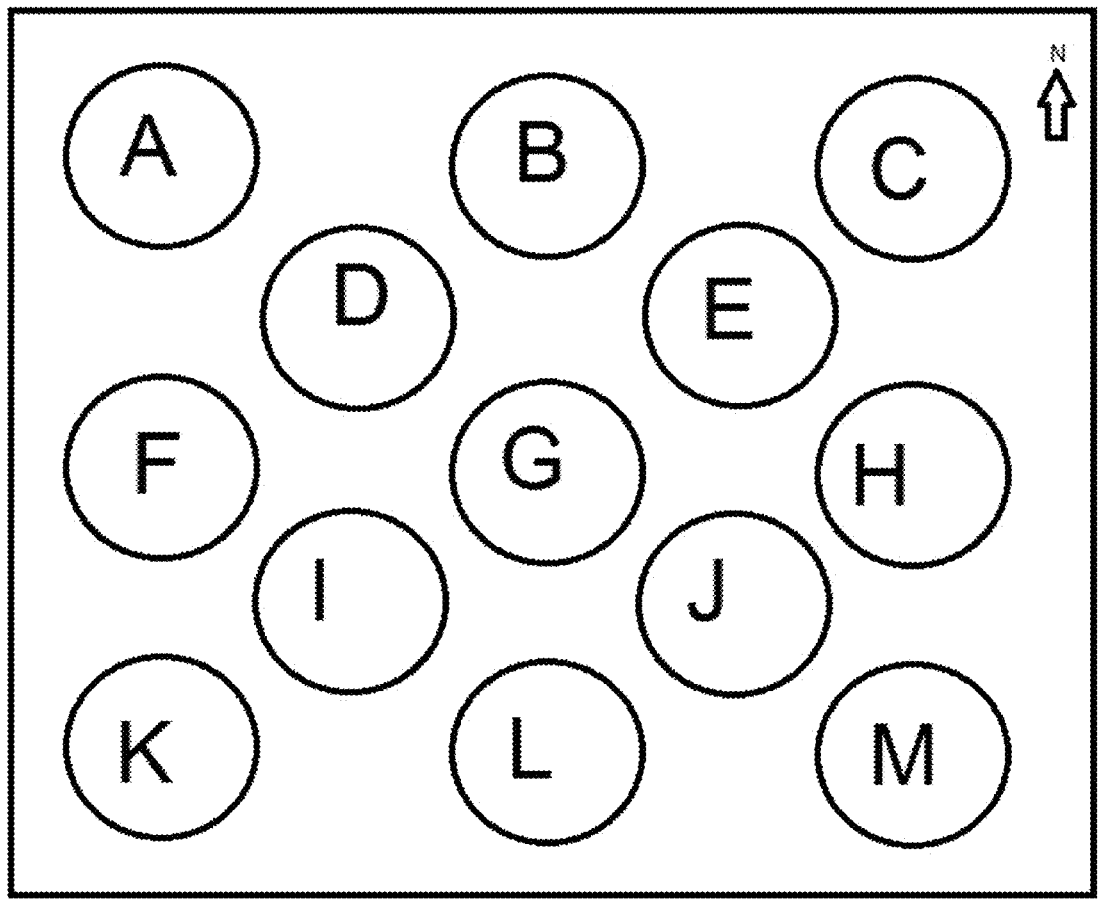
FIG. 5 shows a schematic of a plurality of networked sensors according to certain embodiments.

As shown in FIG. 4, if the user moves from sensor 1 to sensor 8, then 10, then 7, then 9, then 6, the system would determine the user is moving west. In certain embodiments each floor of a building has an array of sensors that define X-Y coordinates of that floor. For example, sensors 1-13 (as shown in FIGS. 1-4) may represent sensors on a first level where sensors A-M (FIG. 5) are on a second level directly above the first. If a mobile device goes from Sensor 1 to Sensor A it is assumed the user travelled from the first floor to the second, perhaps by way of an elevator. Or if a device goes from Sensor L to Sensor 13, it is assumed the device descended from an escalator or flight of stairs. In embodiments where the building has many floor, each floor may have an array of sensor, which when taken together, define a coordinate grid along the X, Y, and Z axes.

Sensor Networking

According to certain embodiments, the plurality of sensors are networked to one another. Networking is achieved through various methods known in the art. According to certain implementations, sensors are networked through hardwired connection. Wired networking may be achieved by various means including but not limited to USB, ethernet, coaxial, firewire, thunderbolt and fiber optics. Networking of the sensors serves at least two purposes: the transfer of data and power supply to the sensors. According to further implementations, the plurality of sensors are networked via Power-line communication (PLC). In this embodiments, networking can be achieved through a buildings already existing power supply infrastructure. According to certain alternative embodiments, the plurality of networked sensors are networked wirelessly, for example by way of a WLAN.

Map Server

In certain exemplary embodiments, the sensor data is sent to a central server via the networked connection. The server stores a map of the building with detailed information about building layout, with reference to the location of the plurality of sensors. As information from the sensors is received by the server, the server calculates the probable location of each user and this positional determination is dynamically refreshed as new sensor data is received. In certain alternative embodiments, the server accesses map information stored remotely such as through a cloud based system. The server functions to integrate the data received from the plurality of sensors with the map data determine user position within the building and outputs location data that is receivable by the user's mobile device.

Location Based Service Modules

According to certain implementations, the system further comprises a plurality of location based service (LBS) modules, accessible by the user. For example, in certain embodiments the plurality of LBS modules comprise a navigation module. The navigation module receives localization data from the map server and provides the user a GUI through which to interface during navigation. According to certain embodiments, the user submits a request for a location in the building through their mobile device and then that query is sent to the server of the building. The server then provides location information via the navigation module which is viewable on the user's mobile device to guide the user to the desired location. In alternative embodiments, map data is stored on the users mobile device or is downloaded from the server upon entering the building. The mobile device would then be able to guide the user based on cross-referencing sensor signal data with the map data downloaded on to the device. In certain implementations, when the navigation module receives data indicating proximity to a given sensor, the navigation module displays a "you are here" locator on a map of shown by the module display interface.

In certain implementations, the plurality of LBS modules further comprise a user-to-user module. According to certain embodiments, the user-to-user module functions to share localization data between two or more users of the system. The user-to-user module facilitates the notification of a user that one or more of a preselected group of other users (friends) are present in the same location or building. In further embodiments, the user-to-user module serves to facilitate the identification of meeting location between individual users.

According to certain embodiments, the plurality of LBS modules further comprise an alert module. Such a module can perform functions similar to a public address system for such things as fire drills and missing person alerts (Amber Alerts). During an emergency, the alert module can "Smart" direct its users in the building to emergency exits. The alert module can also detect pedestrian traffic densities and direct user routes accordingly. For example, if high density is detected at a particular stairwell or if it is detected that a stairwell is inaccessible, traffic is redirect to the next closest, safest exit. In the case of a missing person alert, the alert module could locate the last known location of the missing person's mobile device and direct information to users connected with that person.

According to certain embodiments, the LBS modules further comprise one or more retail modules. In exemplary implementations, a user provides a shopping list and the retail module notifies the user as to the location of stores in the building that carry the items on the list. In further implementations, the retail module provides the user with an optimized travel path through the building and/or through individual stores within the building to most efficiently acquire the list items. For example, a user could write out a shopping list: socks, basketball shoes, headphones, face wash, gift for girlfriend. The retail module returns a list of stores in the building where the listed items are carried and suggests a route to acquire them. In further embodiments, retail stores create a virtual store fronts accessible from the retail module. Additionally, it could list its inventory and location of items with "Sku pin." In further embodiments, the retail module prompts the user with questions about brand/price preference or item priority and returns optimized results based on users answers. For example, based on the user's answers a shopping itinerary is mapped out for the user such as:

"Your shopping list was found in 3 stores. You can find NIKE SOCKS and KOBE IX SHOES in HOUSE OF HOOPS. BOSE HEADPHONES are at the APPLE STORE. WOMEN'S PERFUME and KHIEL'S FACEWASH are at BLOOMINGDALES. Venue suggests you take this route if you are in a hurry."

According to still further embodiments, the plurality of LBS modules further comprise a user activity analytics module. This offers new methods of data mining that was not possible before this technology. Probability cloud models of different demographics could be created analogous to electron clouds around atoms in quantum mechanics. Where only select moments were available for extrapolation, the system provides 1,000s more time data points in the same given time period of consumer behavior.

The Pedestrian Indoor Positional System and Venue Application

Venue is an application that will be found at Apple, Android and other app stores. The app provides positional, inventorial, promotional and social functionality for use in public facilities such as malls, hospitals, casinos and sports arenas. PIPS is the full integration of the patron with the venue via mobile device. In short, PIPS is the process and infrastructure that allows for indoor navigation; the Venue application is the interface that allows the end user to take advantage of PIPS.

Signal Attenuation from building walls and floors limits the strength of GPS indoors. Currently Indoor Positional Systems are being develop to remedy this problem. PIPS will be the first major application of this technology. And what will separate PIPS from every other positional system is it will be accurate on all three planes: allowing positioning on multiple floors along with the traditional longitudinal and latitudinal plane.

Venue will be primarily a utility app. Similar to a ratchet capable of accepting many sockets, Venue has many features not just for consumers/patrons of a venue/building; but it also adds functionality for vendors and custodians of a given building. To better illustrate the multiple uses of Venue, imagine The Smith family. They walk into the Caesars Palace casino in Las Vegas. Will (father) needs to use the restroom. He searches "Bathroom" in Venue gets turn by turn directions to the second floor. Jada (mother) wants to hit the tables and searches "blackjack tables" and goes on her way. Jaden (son) wants the new "Kobe's" and he's immediately directed to the Niketown. Before he even walks into the store, Venue shows the quantity, colors and sizes available of the particular shoe he's looking for. Willow (daughter) decides to just explore. She finds a cool ice-cream shop and posts a network message to her family within Venue. The family "PIPS" Willow's location and are given turn by turn direction to Willow and the ice-cream shop.

Components

Figure 6:
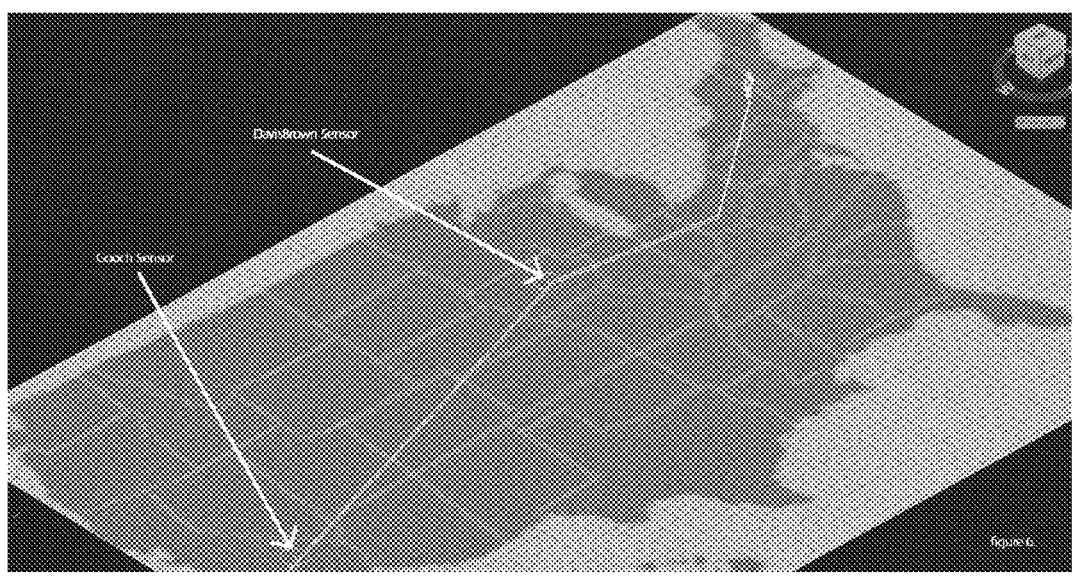
FIG. 6 shows a schematic of the system according to certain embodiments.

The sensors and wiring are the cobblestone and mortar of Pedestrian Indoor Positioning System roadway. The sensors could include, but not limited to a wireless fidelity, bluetooth, hybrid, or both. According to certain embodiments, the system employs a "weak" method. The average bluetooth device uses a max power output of 100 (mW). Instead of trying to boost the signal, QARD purposely lowers the strength of each sensor which then narrows the possible location of a wireless device. Furthermore, rather than having a few sensors/routers in a venue, as many as 1,000s of sensors could be used on a given level of a building. Additionally, each sensor would be unique and a distinct landmark in the sensor array. The most rudimentary example to illustrate how this system works is to picture two wifi networks. One is named DavisBrown Sensor and the other is named Gooch Sensor; respectively located at your office and my residence. Let's say there is a road that runs through New York, Iowa, and California. If a mobile device did not have a GPS nor carrier signal, but had its wifi turned on; and was travelling along this road, one could glean its vicinity if it were to detect either Davis Brown Sensor or Gooch Sensor. Knowing the limitations of a wifi network, if Davis Brown Sensor was detected then it could be assumed that the mobile device could be anywhere but California. More specifically, the mobile device would most likely be in Iowa, most likely in Des Moines. And as the weaker the signal of the wifi router is, the more accurate determination of what neighborhood, street and building the DavisBrown Sensor wifi network would be located. (FIG. 6)

PIPS Process

Transitioning back to PIPS. Take a slice of a PIPS Grid containing 13 sensors (FIG. 1). Assume each sensor is barely strong enough to avoid overlap. Meaning if a mobile device is in the field of Sensor 7, it will be barely out of the range of Sensors 4,5,9, and 10. While completely out of the range of Sensors 1,2,3,6,8,11,12 and 13. And that is just static data. Over elapse time if a mobile device is detected by different Sensors, motion, speed and vector course is calculated. If over time, PIPS detected a mobile device with the Sensors in these particular sequences, the following would have to be assumed: Sensor 12, then 7, then 2=Heading north (FIG. 2) Sensor 1, then 4, then 7, then 10, then 13=Heading southeast (FIG. 3) Sensor 8, then 10, then 7, then 9, then 6=Heading west (FIG. 4) Furthermore, say sensors 1-13 are on level 1 and say Sensors A-M are on the Level 2. (FIG. 5) If a mobile device goes from Sensor 1 to Sensor A it is assumed the device travelled up an elevator. Or if a device goes from Sensor L to Sensor 13, it is assumed the device descended from an escalator or flight of stairs. The current capacity of a bluetooth device of detection 8 unique devices. To boost the capacity of a given sensor to possibly detect up to dozens or hundreds in its region PIPS would incorporate an eliminating cycler algorithm. The algorithm would allow the sensor to detect 8 unique devices. Once catalogued. those 8 unique devices would be ignored and a new unique 8 devices would be allowed to be detected and so on—until no unique devices are detected. Then the remaining devices still in the sensor range would be redetected and so on. This procedure allows for high population functionality for PIPS while also providing more minute data collection within a sensor range. If signal strength of a mobile device stays the same, it is assumed the device is stationary. Or if the signal is getting weaker or stronger, it is assumed the mobile device is leaving or approaching the epicenter of the Sensor. Earlier the sensors were compared to cobblestone. The wiring is the mortar the gives the street form. The wiring could include, but not limited to USB, ethernet, coaxial, firewire, thunderbolt and fiber optics. The Wiring serves two purposes: the transfer of data and power supply to the sensors. Similar to the electrical system of the building, the wiring needs to be piped into every extremity of the building. Another analogy is the wiring is essentially the nervous system of PIPS. Like nerves in a living person that detect sensation from toes and fingers while sending commands from the brain to move those very appendages, the wiring in PIPS is the conduit between the sensors and Venue Console. The sensors collects information from the mobile device and relays that information to the Venue Console. Additionally, the Venue Console sends information via wiring to the sensors which then communicates directly with the mobile device. To fully articulate this relationship between mobile device, sensor and wiring, a better description of the Venue Console must be given along with an introduction to the software that interfaces the whole PIPS. The Venue console is a major hub of the PIPS. It is the last piece of hardware involved in the PIPS method. The Venue Console is responsible for archiving all the data collected by the sensors. There are some tasks that can be completed independent of the Venue Console but for the most part the console is vital for the functionality of PIPS in regards to internet access, communication both "device to venue" and "device to device."

Venue

The software that would utilize PIPS would be VENUE. There would be several versions of the Venue app that take advantage of the PIPS universe.

Venue Global—Global Tech support/App Development

Venue Patron—End User

Venue Local "Beverly Center—Beverly Hills" for example—Building support and the conduit from the Venue Console to the software Venue Vendor—Stores located in a "Venue" equipped building Venue "X"—An open slot available for other apps, businesses or functions such as social media.

Figure 11:
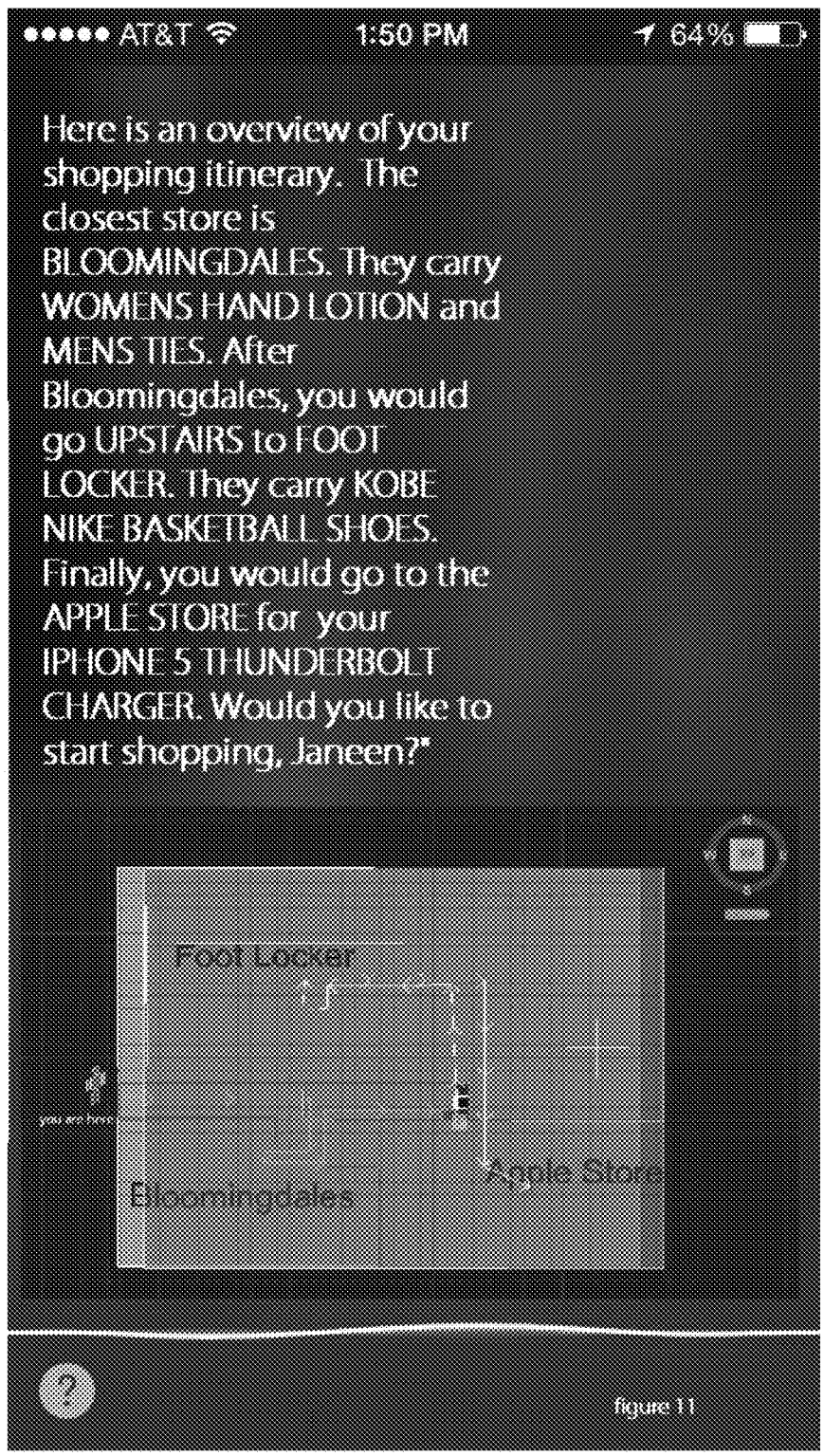
FIG. 11 shows an exemplary graphic user interface according to certain embodiments.
Figure 12:
FIG. 12 shows a schematic of the system according to certain embodiments.
Figure 13:
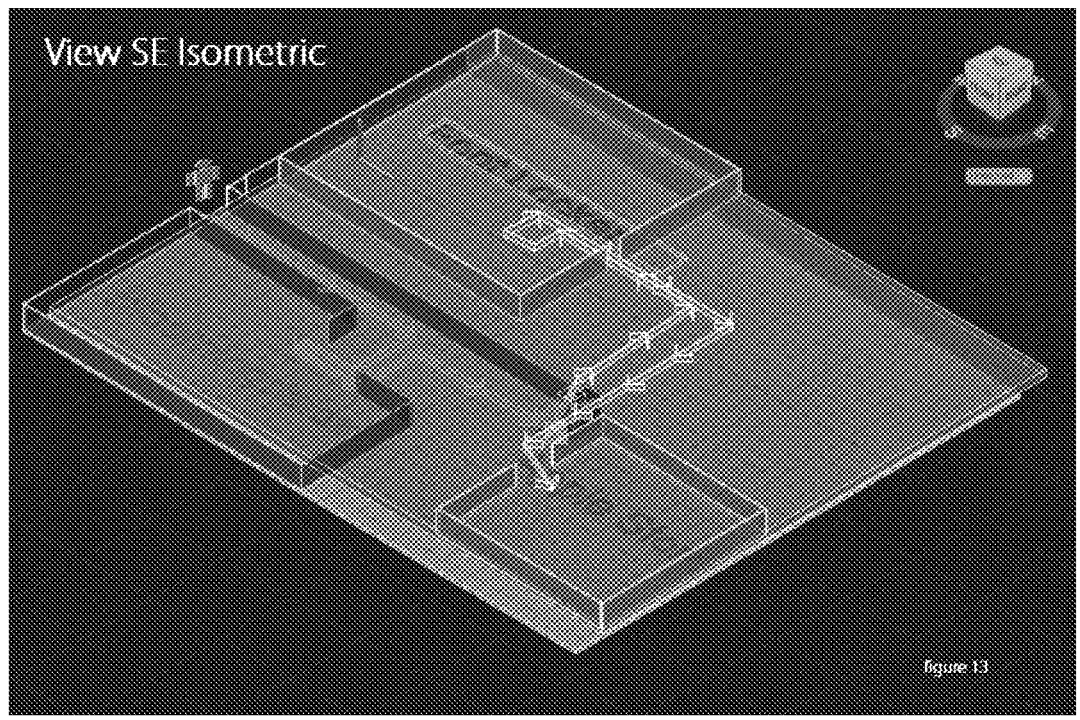
FIG. 13 shows a schematic of the system according to certain embodiments.
Figure 14:
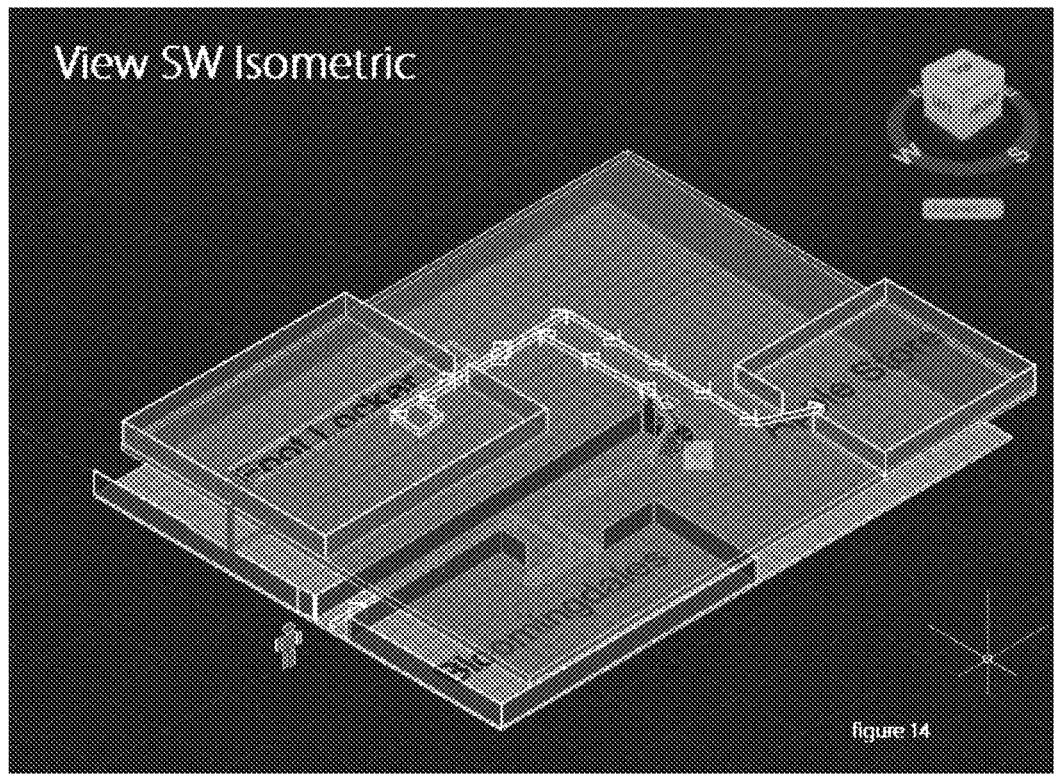
FIG. 14 shows a schematic of the system according to certain embodiments.
Figure 15:
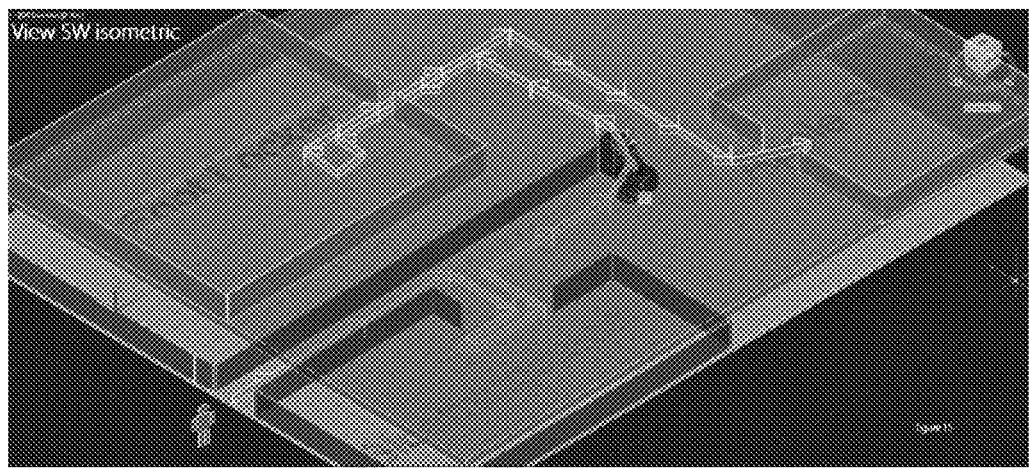
FIG. 15 shows a schematic of the system according to certain embodiments.

From the positional aspect, the end user would use their mobile device to navigate through a venue with the Venue Patron application. Like most problems, there are several ways to get to the solution; and in the case of indoor pedestrian navigation there are two simultaneous methods. (FIG. 7) The first is the End user types in a request to a location in the Venue Patron application and then that query is sent to the Venue Console of the building. The Venue Console then sends the answer back to the mobile device via wiring and sensors guiding the end user to the desired location. The other method would be completely independent of the Venue Console. The "Venue Patron" application would have all the sensor locations and building layout readily available. As long as the sensors were functional, the "Venue Patron app would be sufficient enough for an end user to find their way through a "Venue" equipped building—as long as the mobile device was capable of calculating orientation (compass). Essentially every instance a sensor would be triggered that would show up as a "you are here" locator in the Venue Patron app. In the second method of navigation the end user could get the desired information independent of the Venue Console. But when other end users are added to the equation the Venue Local will be needed. Functions like "me to you" can be implemented. If two End Users, Steve and Bill are both using Venue Patron and are "friends" within the Venue network, Venue Local would seek both out and notify them they are in the same venue. Furthermore, they could be navigated to each other on the fly—"me to you" or "meet here." Within a Venue Local a building would have its layout, lists of stores, restrooms, help centers, etc. Also it would be the digital version of its PA system for such things as emergency evacuations and Amber Alerts. In case of an emergency, Venue Local could "Smart" direct its patrons in the building to emergency exits. Venue local could detect a traffic jam at a particular stairwell or deduce that a stairwell is inaccessible and redirect patrons to the next closest, safest exit. In the case of an Amber Alert, Venue Local could locate the last known location of the missing person's mobile device. It can send a direct message to every Venue Patron user vital information of the missing person instantly. With Venue Vender A store could create a virtual store front within the Venue Universe. Additionally, the vendor could list its inventory and location of items with "Sku pin" Also within the Venue "X" realm, high function capabilities as "Itinerary Shopping lists" are possible a person could write or voice command (FIG. 8) a shopping list: basketball shoes, women's' hand lotion, men's' ties and iphone charger. Questions about brand/price preference or item priority are asked by Venue via Maven Shopper assistant. Based off the Patron's answers a shopping itinerary could be mapped out for the patron such as: "Here is an overview of your shopping itinerary. The closest store is BLOOMINGDALES. They carry WOMEN'S HAND LOTION and MEN'S TIES. After Bloomingdales, you would go UPSTAIRS to FOOT LOCKER. They carry KOBE NIKE BASKETBALL SHOES. Finally, you would go to the APPLE STORE for your IPHONE 5 THUNDERBOLT CHARGER. Would you like to start shopping, Janeen?" (FIG. 11).

PIPS and VENUE is the unique solution for the lack of an accurate method for indoor navigation. PIPS offers location, speed and vector direction of a mobile device on the x,y, and z axis—a 3-dimensional locator. The technology is somewhat relatively available to make this real. The PIPS sensor differs from the traditional bluetooth device in that it is purposely weaker by ⅕ an average bluetooth device 6×6 ft. compared to 30×30 ft. Not only can the sensors communicate with mobile devices, in some emergency cases, the sensors will be called upon to communicate with each other. The PIPS sensor is unique in its "elimination cycler" function—boosting its capacity to detect $100s$ of unique devices in a short time span. The Venue app unifies the brand new PIPS technology with patron, building and vendor. It allows functionality in unprecedented ways in this untouched technology.

Venue Global will offer new methods of data mining that was not possible before this technology. Probability cloud models of different demographics could created analogous to electron clouds around atoms in quantum mechanics. Where only select moments were available for extrapolation, PIPS and Venue provides 1,000s more time data points in the same given time period of consumer behavior.

Venue Mobile Application Description

The Venue Mobile application (Venue patron) is the final component that allows Pedestrian Indoor Positioning System to work. The Venue app is the interface an End User operates on their mobile device in order to navigate in a particular "Venue" equipped building.

Figure 17:
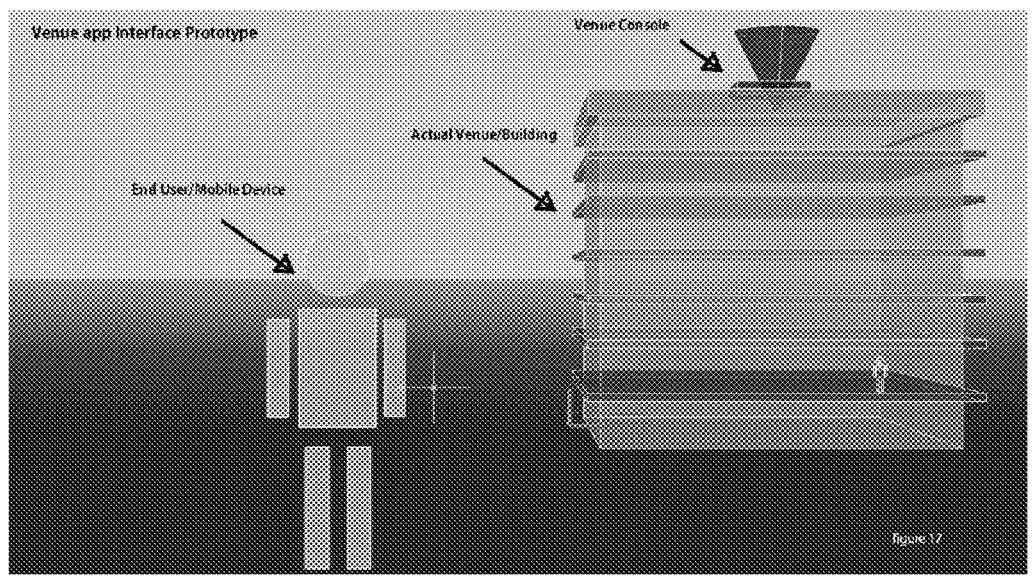
FIG. 17 shows an exemplary graphic user interface according to certain embodiments.

In Venue app Interface Prototype FIG. 17. The 3 general components are shown: The End user/mobile device, building, and Venue Console. The Venue console is a component of the PIPS system—which will be explained later on.

Figure 18:
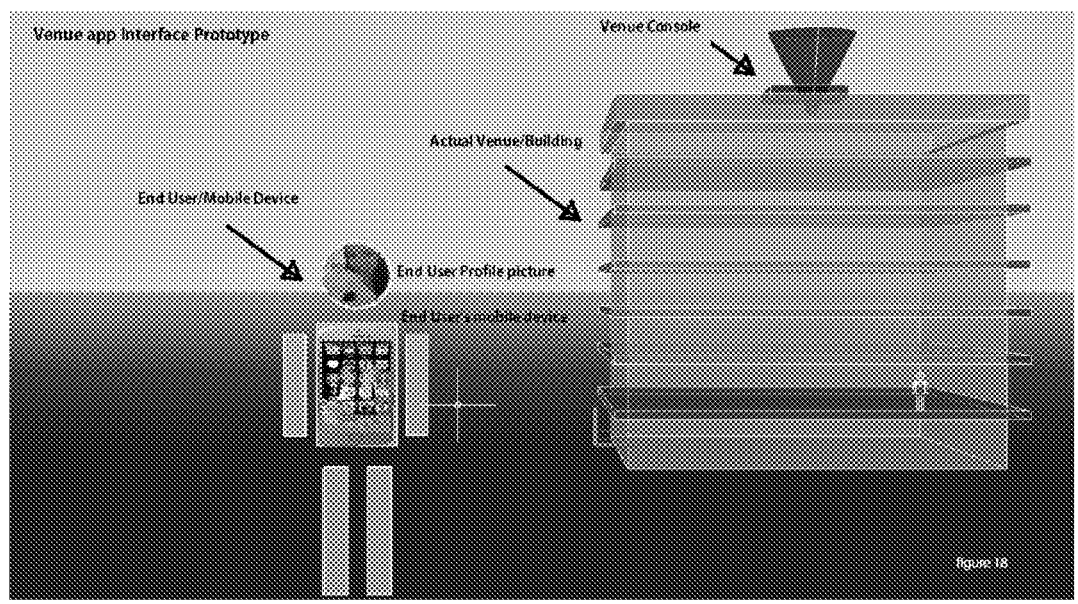
FIG. 18 shows an exemplary graphic user interface according to certain embodiments.

The end user is represented by the human avatar (head, two arms, two legs) In Venue app Interface Prototype FIG. 18 the avatar is customized. In the head there is a profile picture representing the End User (Janeen). And in the body, an image of the End user's mobile device (White & Gold iPhone 5s) This avatar is the marker in the application that represents the end user and mobile device's location within the Venue app.

In FIGS. 17 & 18 an avatar is standing on the second floor of a building.

Figure 19:
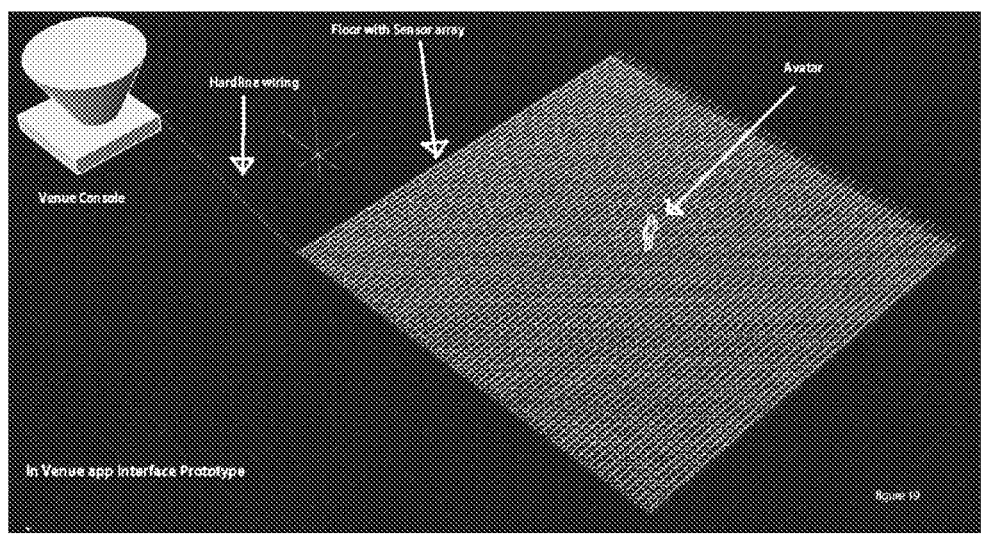
FIG. 19 shows a schematic of the system according to certain embodiments.
Figure 21:
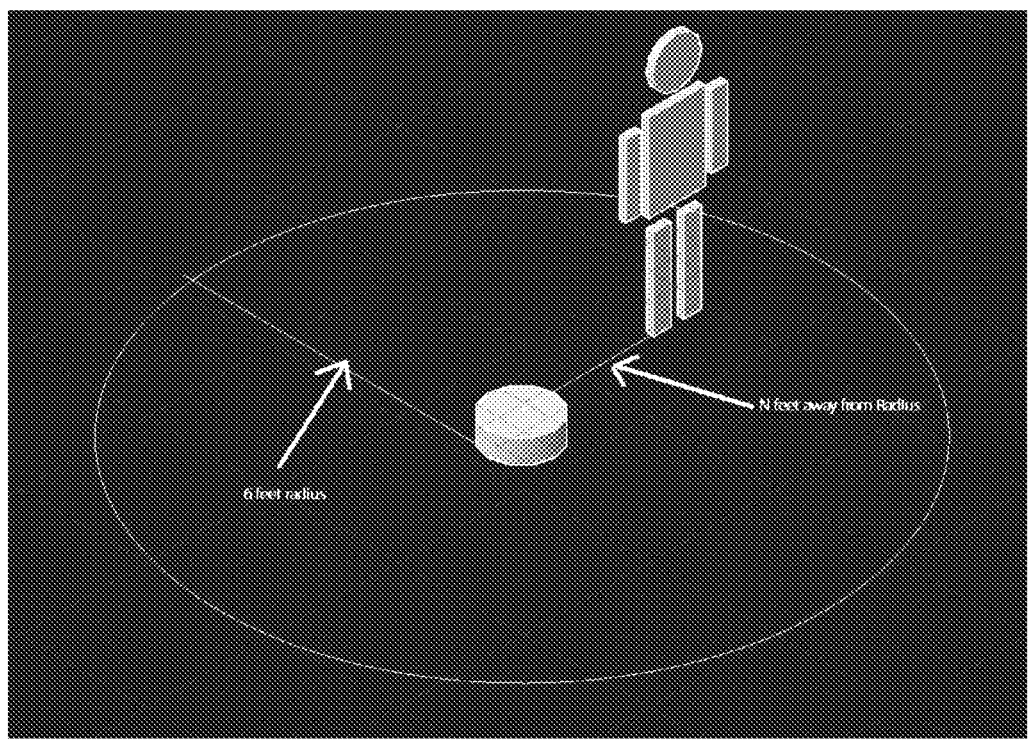
FIG. 21 shows a schematic of the system according to certain embodiments.

In Venue app Interface Prototype FIG. 19 strips the building away and focus just on the second floor. The avatar is shown standing in a Sensor Array (array not to scale). Each floor has a sensor array and is hardwired to the Venue Console. The PIPS method of location is based off the philosophy of lower signal strength, more detectors/sensors. Venue app Interface Prototype FIG. 4 is a close up of the avatar in the sensor Array. The sensors that don't detect the End User/Mobile device is just as important as the sensors that do detect the End User/Mobile device. An extreme example of a problematic situation is if every sensor was strong enough to detect an End User/Mobile device in a 5 mile radius, then every sensor would detect an End User/Mobile device (EU/MD) essentially voiding out the sensor's data is noise and unreliable in finding an End User/Mobile device. However if 3,000 out of 3,030 sensors does not detect an (EU/MD) then it could logically assumed the (EU/MD) is located somewhere around the 30 sensors that did detect it. And if those 30 sensors are clustered together in a sphere or circular formation, it is assumed the (EU/MD) is someone in that cluster of sensors. Furthermore, if the sensor strength is only 6 feet, then the (EU/MD) location is most likely in that cluster zone+6 feet. And as the signal strength of the sensors weakens compared to 6 feet, the number of sensors in the detection cluster decreases along with the probability of location of (EU/MD) by cluster zone+6−(6−N) feet. (FIG. 21)

The calculation for location is done within the app allowing the (EU/MD) to navigate independent of the Venue console. Additionally, this location is determined within the Venue console to allow global (venue functionality) such as population probability clouds (big data) or "Itinerary shopping list" within the MAVEN PERSONAL SHOPPER function. Maven is the AI personality the End User communicates with via voice command or type.

To best illustrate, follow this exchange between End User (Janeen) and Maven Personal Shopper.

Figure 8:
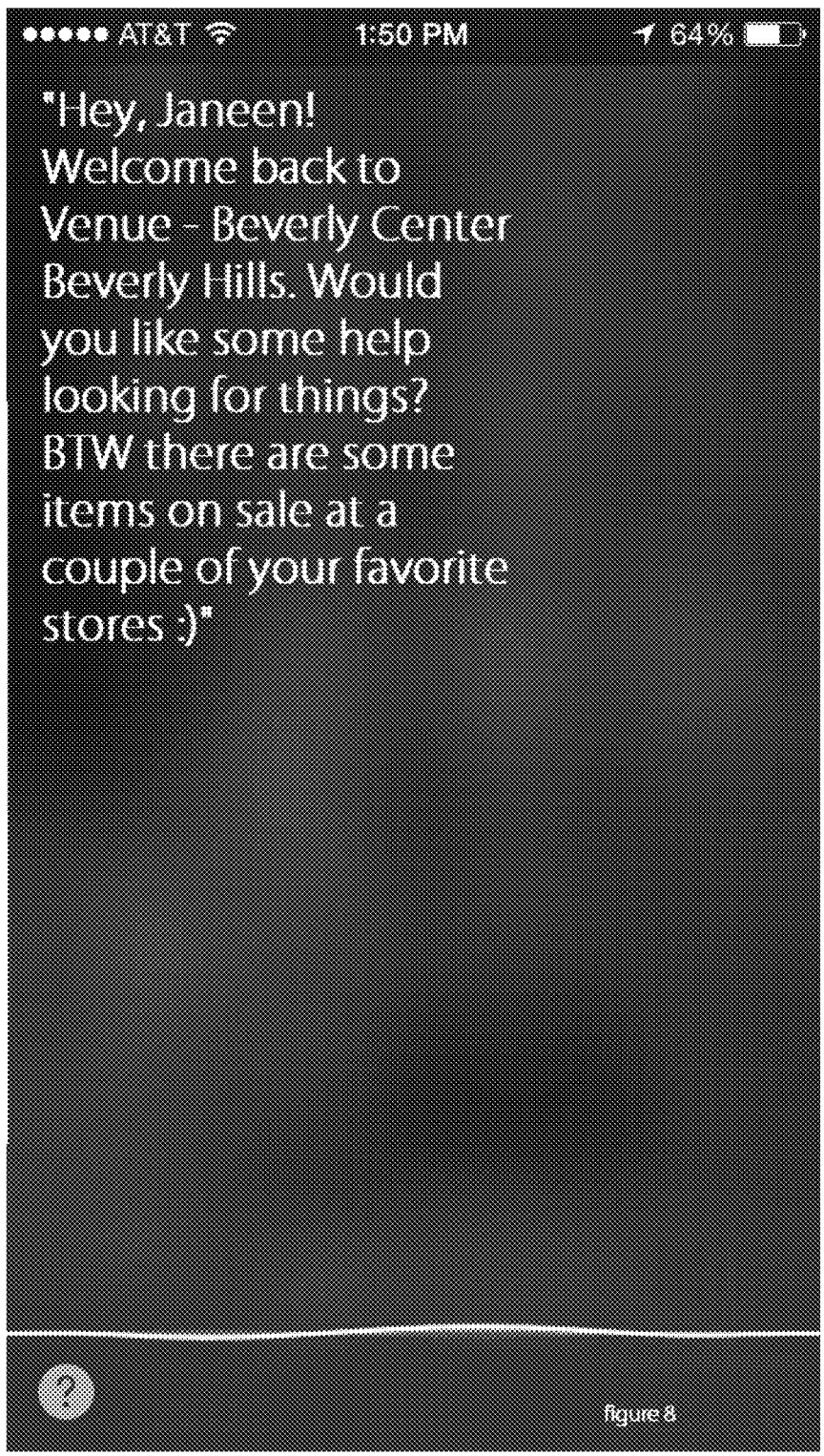
FIG. 8 shows an exemplary graphic user interface according to certain embodiments.

FIG. 8. "Hey, Janeen! Welcome back to Venue—Beverly Center Beverly Hills. Would you like some help looking for things? BTW there are some items on sale at a couple of your favorite stores :)"

Figure 9:
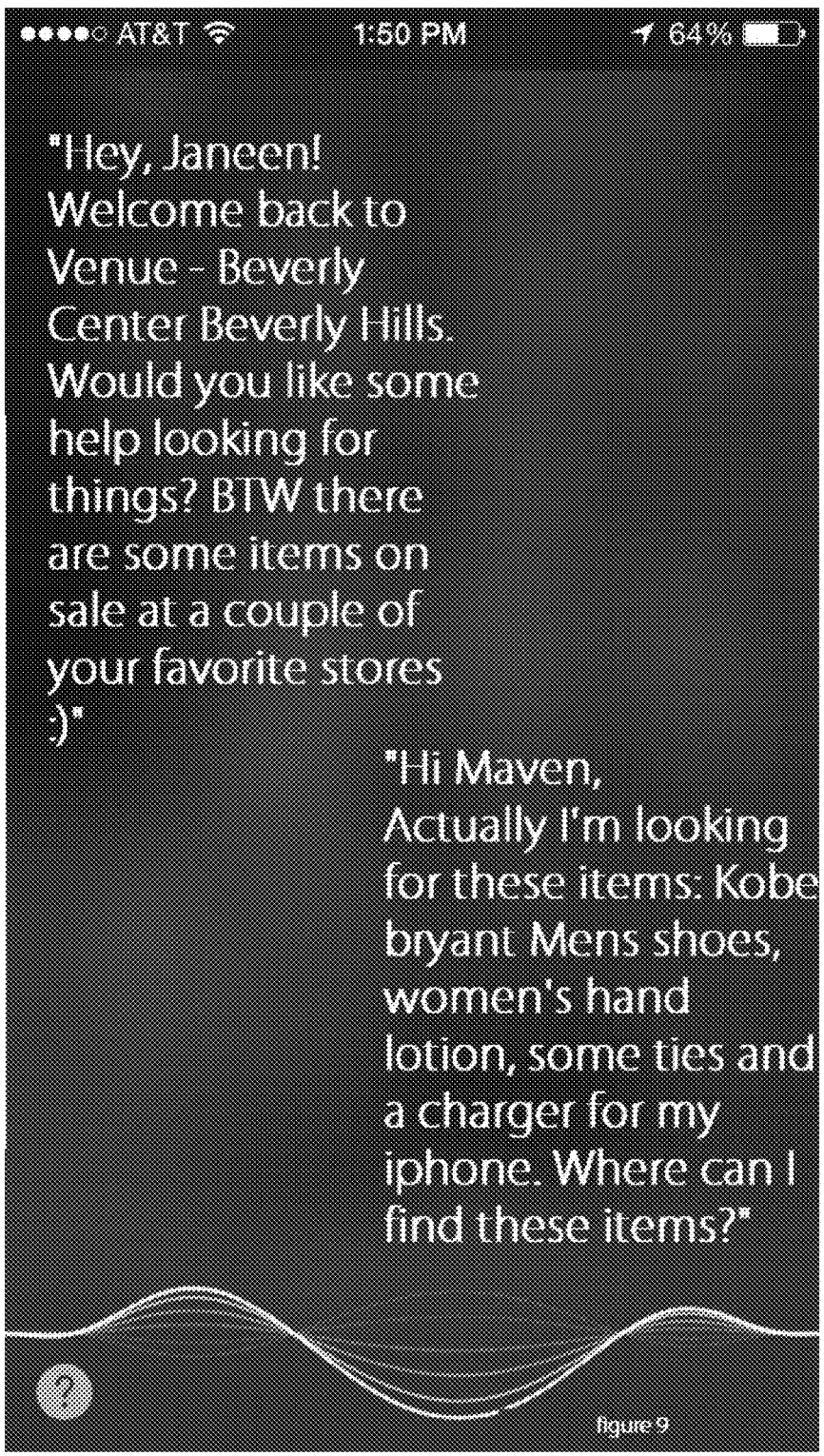
FIG. 9 shows an exemplary graphic user interface according to certain embodiments.

FIG. 9. "Hi Maven, Actually I'm looking for these items: Kobe Bryant Men's shoes, women's hand lotion, some ties and a charger for my iphone. Where can I find these items?"

Figure 10:
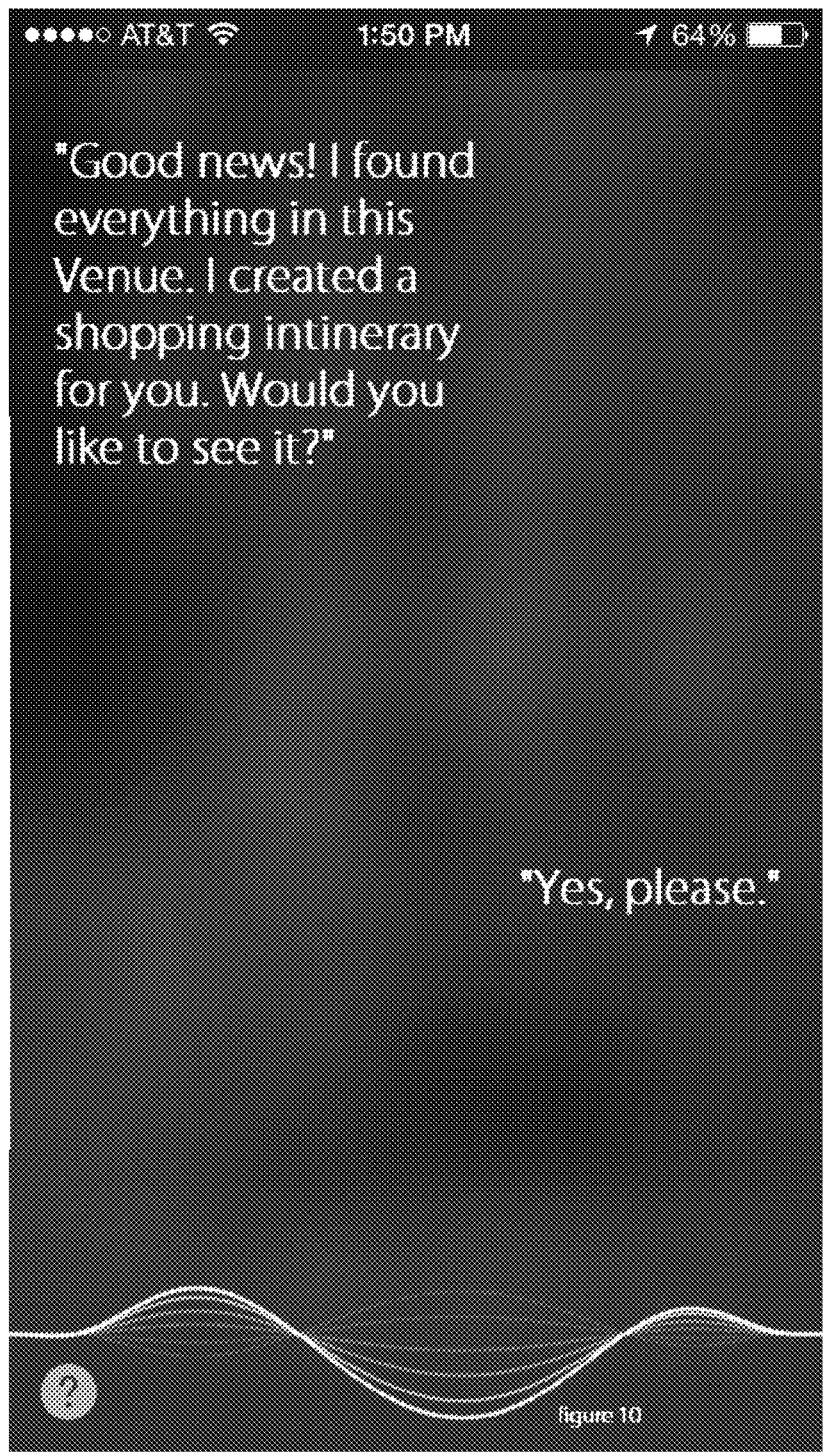
FIG. 10 shows an exemplary graphic user interface according to certain embodiments.

FIG. 10. "Good news! I found everything in this Venue. I created a shopping itinerary for you. Would you like to see it?"

"Yes, please"

FIG. 11. "Here is an overview of your shopping itinerary. The closest store is BLOOMINGDALES. They carry WOMEN'S HAND LOTION and MEN'S TIES. After Bloomingdales, you would go UPSTAIRS to FOOT LOCKER. They carry KOBE NIKE BASKETBALL SHOES. Finally, you would go to the APPLE STORE for your IPHONE 5 THUNDERBOLT CHARGER. Would you like to start shopping, Janeen?"

According to certain embodiments, Maven exhibits human speech patterns, learned from "mirrored conversation" with Janeen, e.g. exclamations, acronyms, idioms, hashtags.

FIGS. 12-15 are visual models of a Venue shopping itinerary or basic navigation aid.

Figure 16:
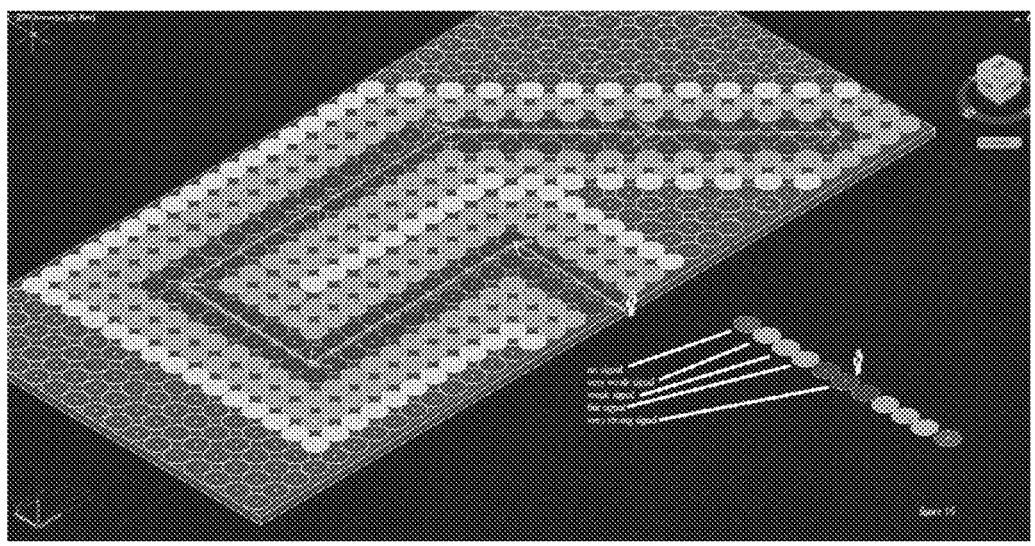
FIG. 16 shows a schematic of the system according to certain embodiments.

FIG. 16 shows a sensor centric point of view. Six feet is the optimal range of PIPS sensors. As with bluetooth and wifi, it is not a complete cut off of signal after a device leaves the optimal zone—it is more of a gradual degradation of signal strength. In FIG. 16 there is a gradient going from grey=no signal to red=full signal. As the mobile device travels through a sensor array, at any given point it triggers multiple sensors at different strengths. The sum of those data points contributes to the accurate location of the mobile device.

Basic navigation can be achieved separate of the Venue Console. As a mobile device interacts with its surrounding sensors, the information gathered is enough for the Venue app to help the End User travel in a building. In order for additional functionality to occur, the Venue Console (VC) must be utilized. The Venue Console is the brain of the PIPS system. The VC is where search engine data is calculated, stored, sent and received. The VC allows for End user to End user interaction. Additionally, the VC allows for smart features like "Shopper Itinerary" and "emergency building evacuation" and "real-time locational Amber Alerts." The PIPS Architectural flowchart (FIG. 7) shows the interrelationships the Venue Console has with each component.

EXAMPLES

Figure 7:
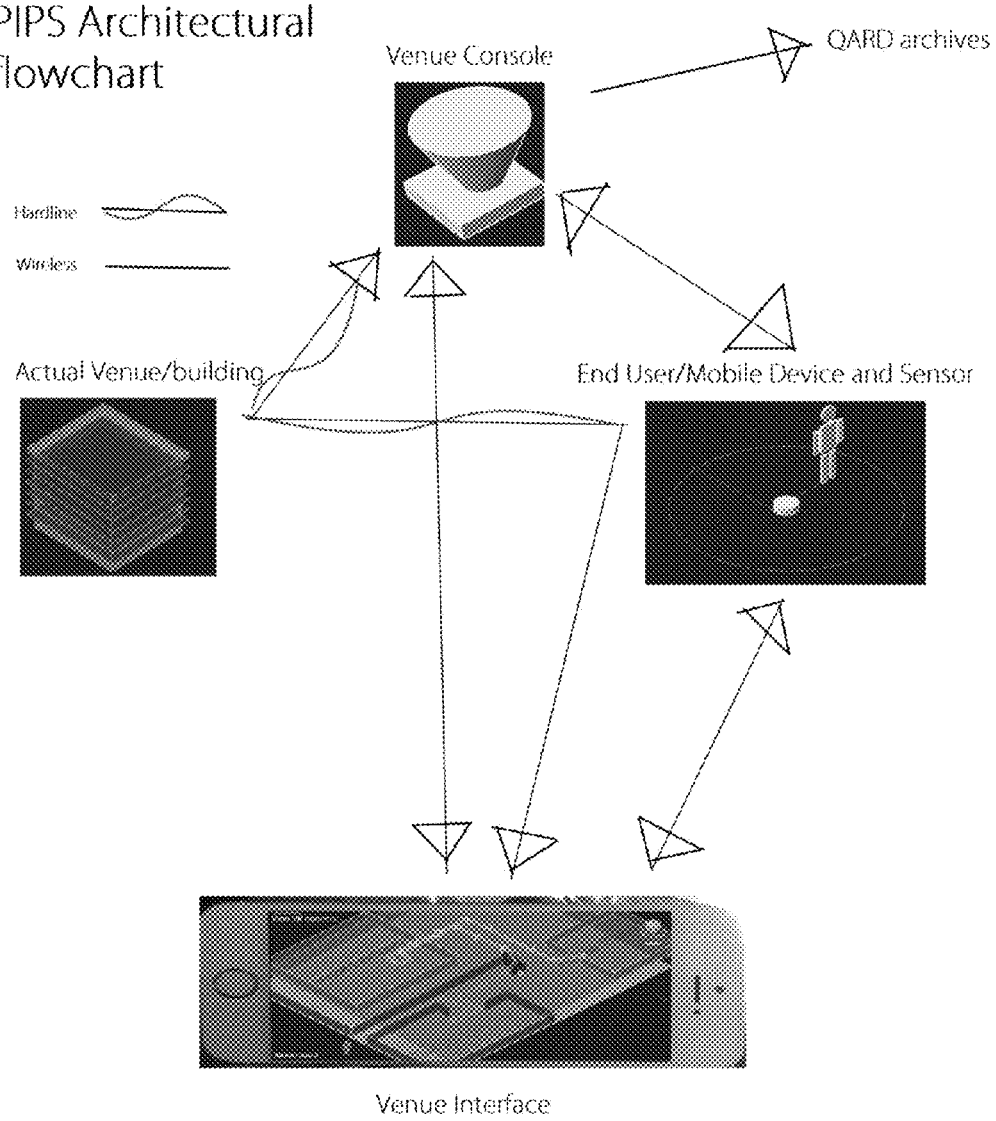
FIG. 7 shows flowchart of the system according to certain embodiments.

The Venue Interface (Venue app) represents the End User's entry point into the PIPS system. The Venue Interface (VI) connects to the Sensors via wireless connection. Functionality is limited to navigation. And vice versa for Sensor to VI. VI connects directly to VC via PIPS wireless system and/or Mobile carrier network. Full functionality of Venue and PIPS system is available with VC or mobile carrier connectivity. And vice versa for VC to VI. (FIG. 7)

There are hybrid paths of data travel. VI gets location from Sensor via W-Fi connection, then sensors communicates with building via hard-line. then building connects to VC via hard-line. So that pathway for VC to VI/VI to VC is a hybrid of wifi and hard-line. An additional connection to consider is VC to QARD archives. The archives stores all the location data. This raw information allows for Big Data extrapolation. Concepts like 3-demensional probability clouds can be formed.

Figure 20:
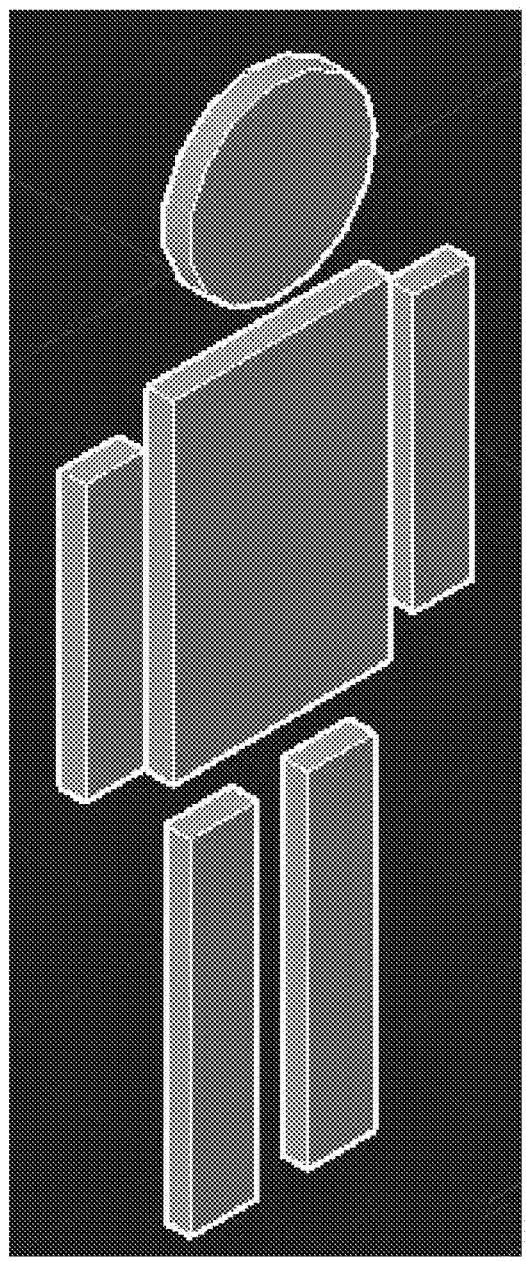
FIG. 20 shows a schematic of the system according to certain embodiments.
Figure 22:
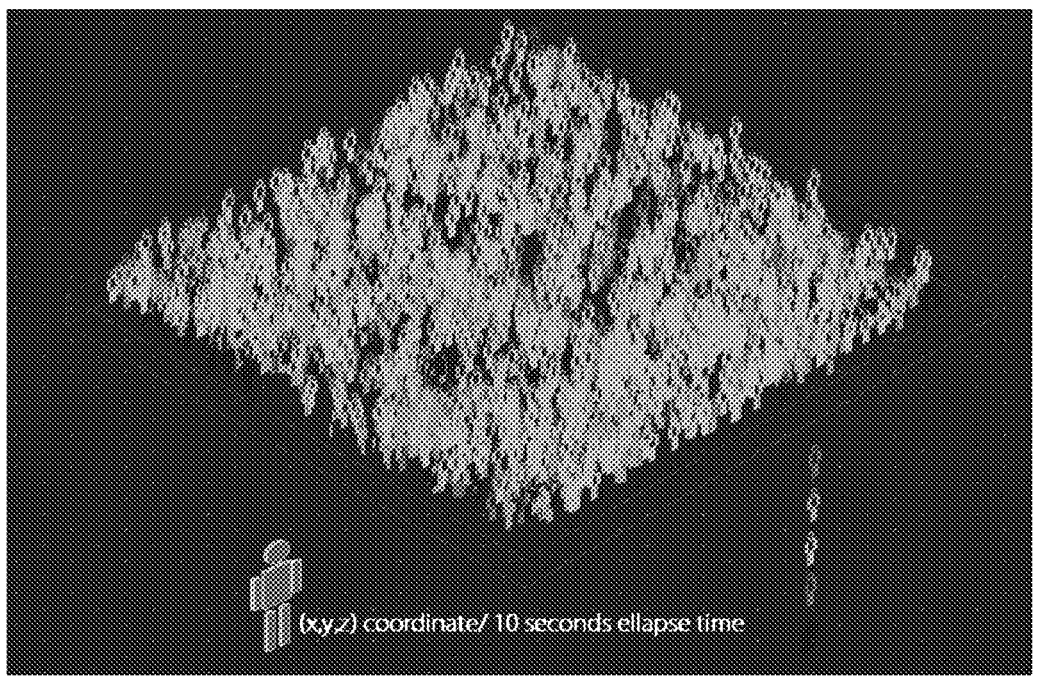
FIG. 22 shows a schematic of the system according to certain embodiments.
Figure 23:
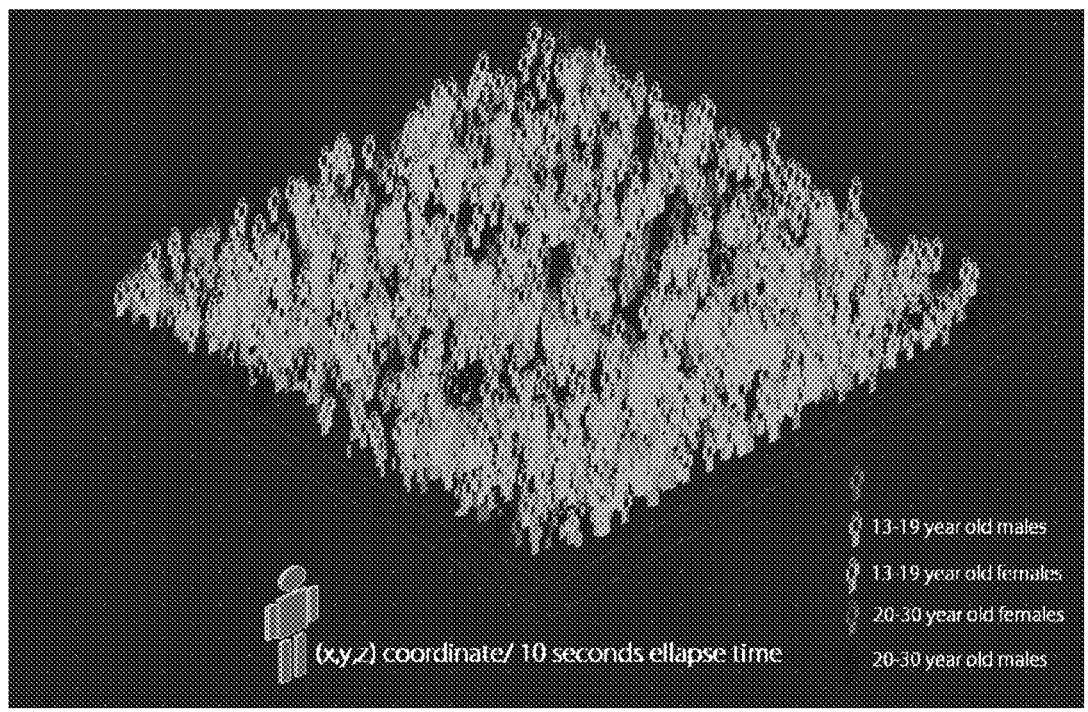
FIG. 23 shows a schematic of the system according to certain embodiments.
Figure 24:
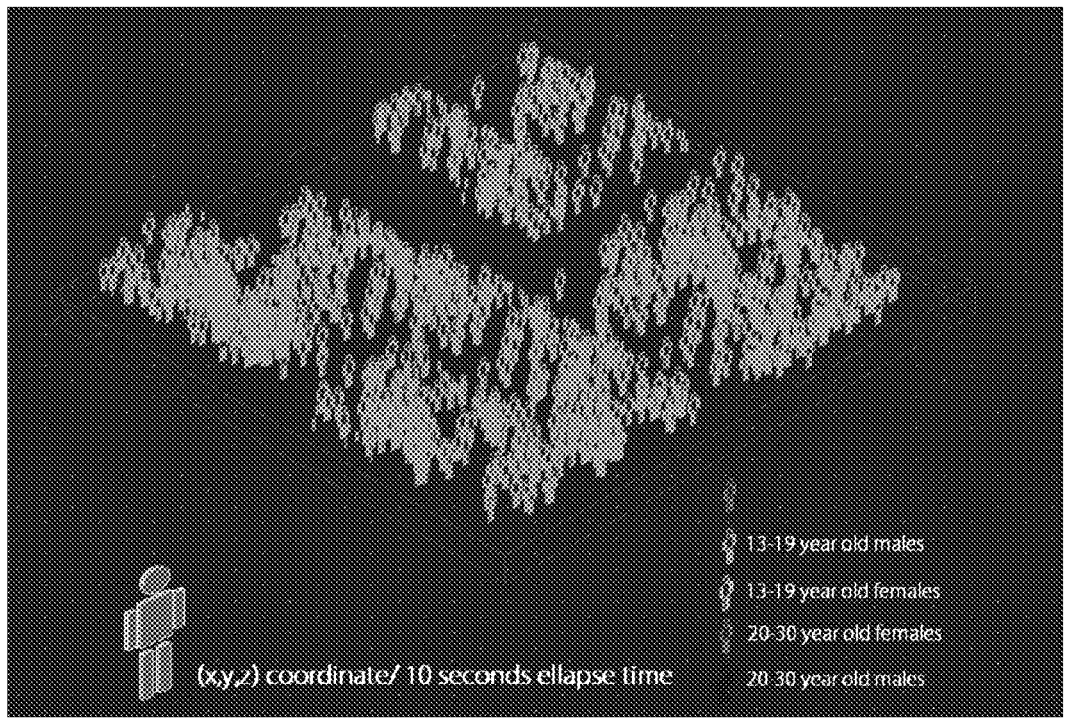
FIG. 24 shows a schematic of the system according to certain embodiments.
Figure 25:
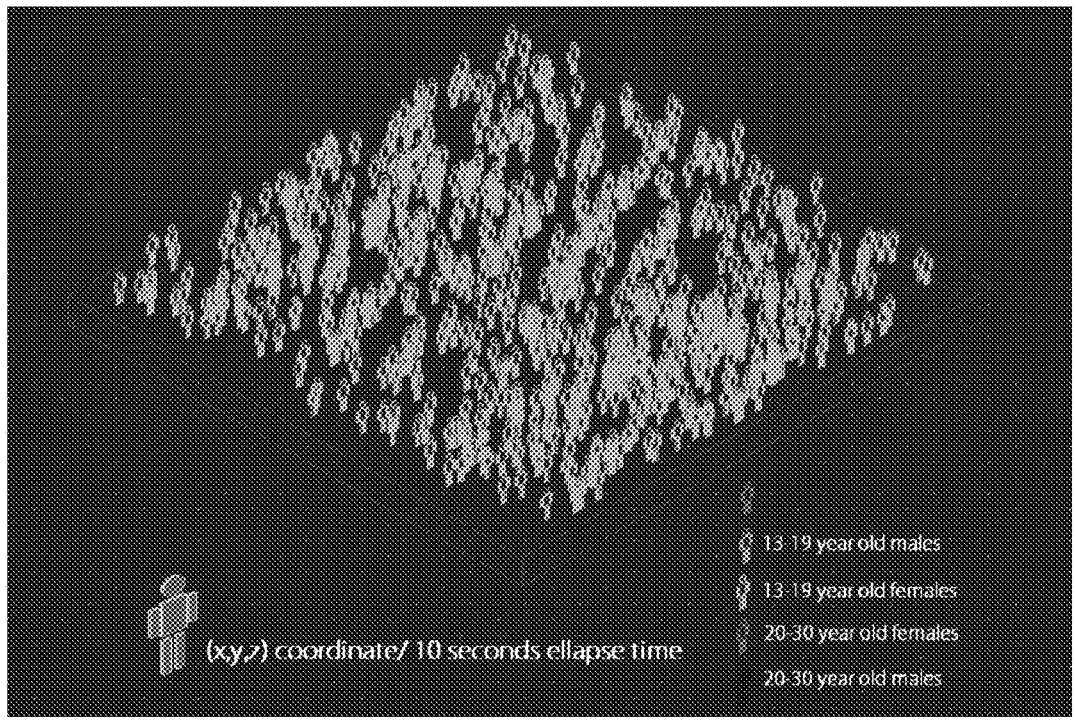
FIG. 25 shows a schematic of the system according to certain embodiments.
Figure 26:
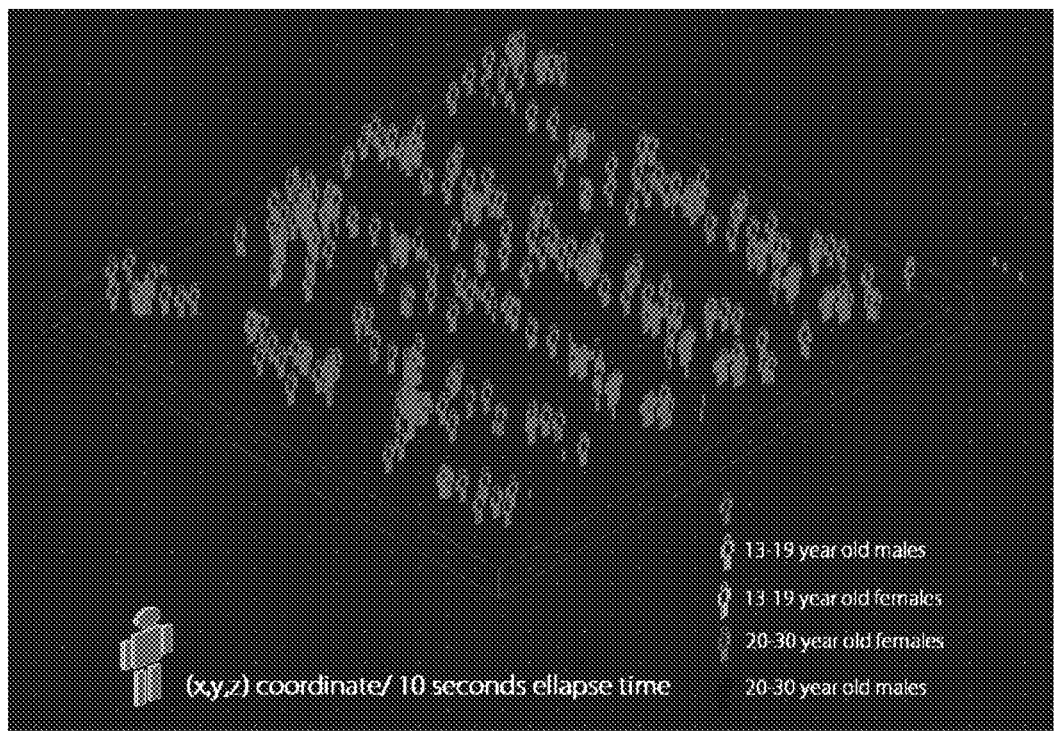
FIG. 26 shows a schematic of the system according to certain embodiments.
Figure 27:
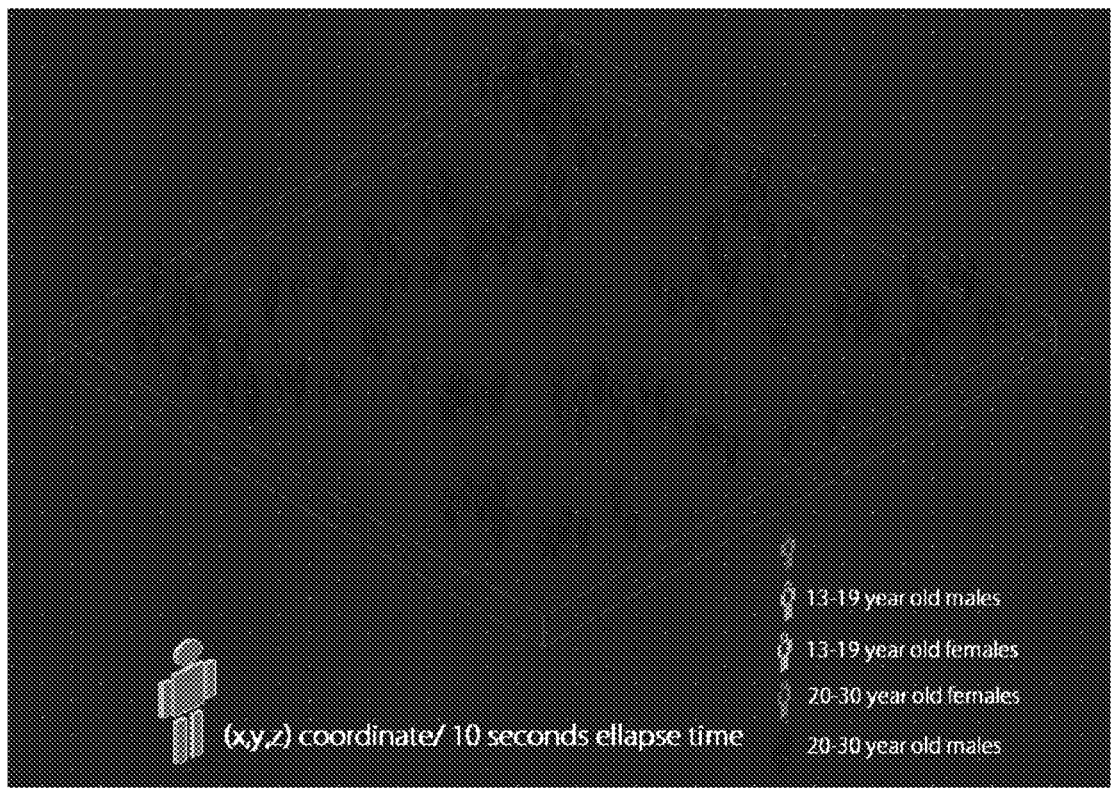
FIG. 27 shows a schematic of the system according to certain embodiments.
Figure 28:
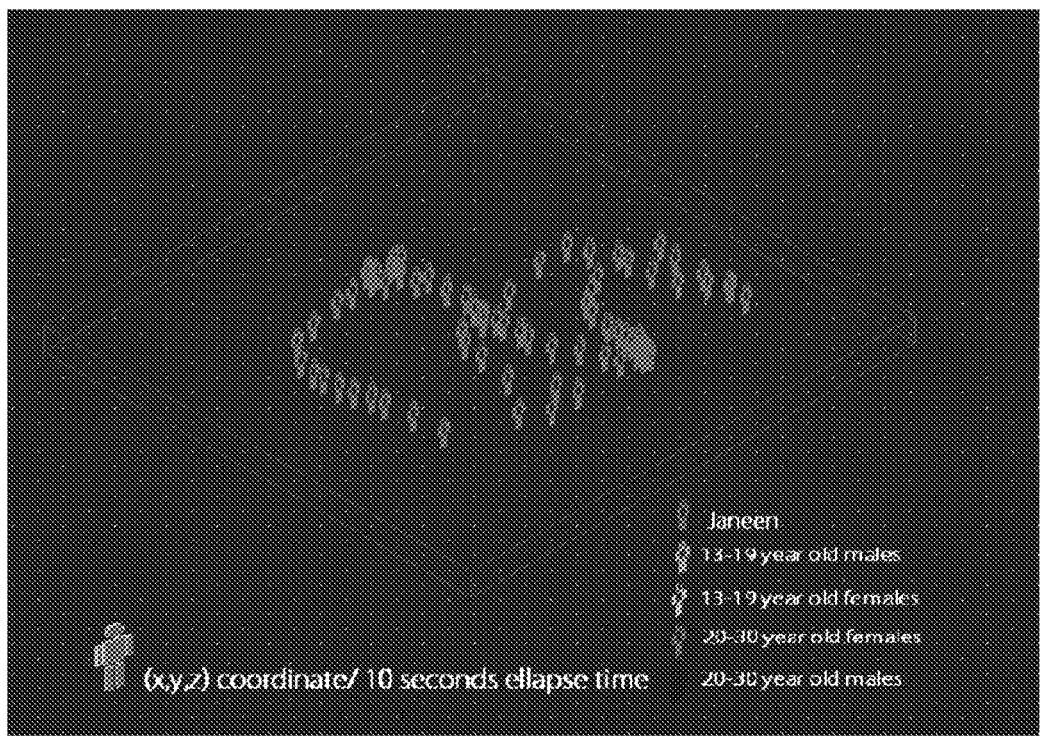
FIG. 28 shows a schematic of the system according to certain embodiments.

An Avatar (FIG. 20) represents a mobile device's most likely (x, y, z) coordinate/Variable-M seconds elapsed. In (FIG. 22) 2 hours of mall data is shown for the populations of 13-30 males and females on one level of a Venue. Each avatar represents an (x, y, z) coordinate/10 seconds elapsed time. The population can be broken down into different subgroups. In (FIG. 23) The same data all of sudden has some distinction. The large group can be visually separated into 4 groups: 13-19 year old males and females; and 20-30 year old males and females. Furthermore, each subgroup can be isolated. (FIGS. 24-27), all the way down to an individual's location over elapse time (FIG. 28). All this can be multiplied by however many floors a Venue has. Hence, a location probability cloud over 4-dimensions (x, y, z, time).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A system for determining the indoor localization of a mobile device comprising;
   a plurality of networked sensors, positioned in a building, capable of detecting a mobile device signal, wherein the position of the plurality of networked sensors defines a coordinate grid;
   a server receiving mobile device signal input from the plurality of networked sensors;
   a map module accessible by the server, the map module having a map of the building and an overlay of the coordinate grid, wherein the map module determines localization of the mobile device with reference to the coordinate grid;
   one or more location based service (LBS) module receiving input from the map module and accessible to a user of the mobile device; and
   wherein each of the plurality of networked sensors is configured to detect a plurality of unique mobile device users and wherein each of the plurality of networked sensors is further configured to execute an elimination cycler algorithm, wherein after initial detection of a unique mobile device user, the elimination cycler algorithm eliminates said unique mobile device user from subsequent detection.

2. The system of claim 1 wherein the plurality of networked sensors are Wi-Fi sensors.

3. The system of claim 1 wherein the plurality of networked sensors are Bluetooth sensors.

4. The system of claim 3 wherein the Bluetooth sensors have a sensor field of about six feet.

5. The system of claim 1 wherein the plurality of networked sensors are a combination of Wi-Fi sensors and Bluetooth sensors.

6. The system of claim 1 wherein each of the plurality of networked sensors has a minimally overlapping detection field.

7. The system of claim 1 wherein the mobile device signal is a unique identification number.

8. The system of claim 7 wherein the mobile device signal is a unique identification number and a signal strength indicator.

9. The system of claim 1 wherein the LBS service module comprises a navigation module.

10. The system of claim 1 wherein the LBS service module comprises a retail module.

* * * * *